May 9, 1961 W. BÜLOW 2,983,447
SLIDE RULE AND ADDING DEVICE COMBINATION
Filed Sept. 24, 1953 2 Sheets-Sheet 1
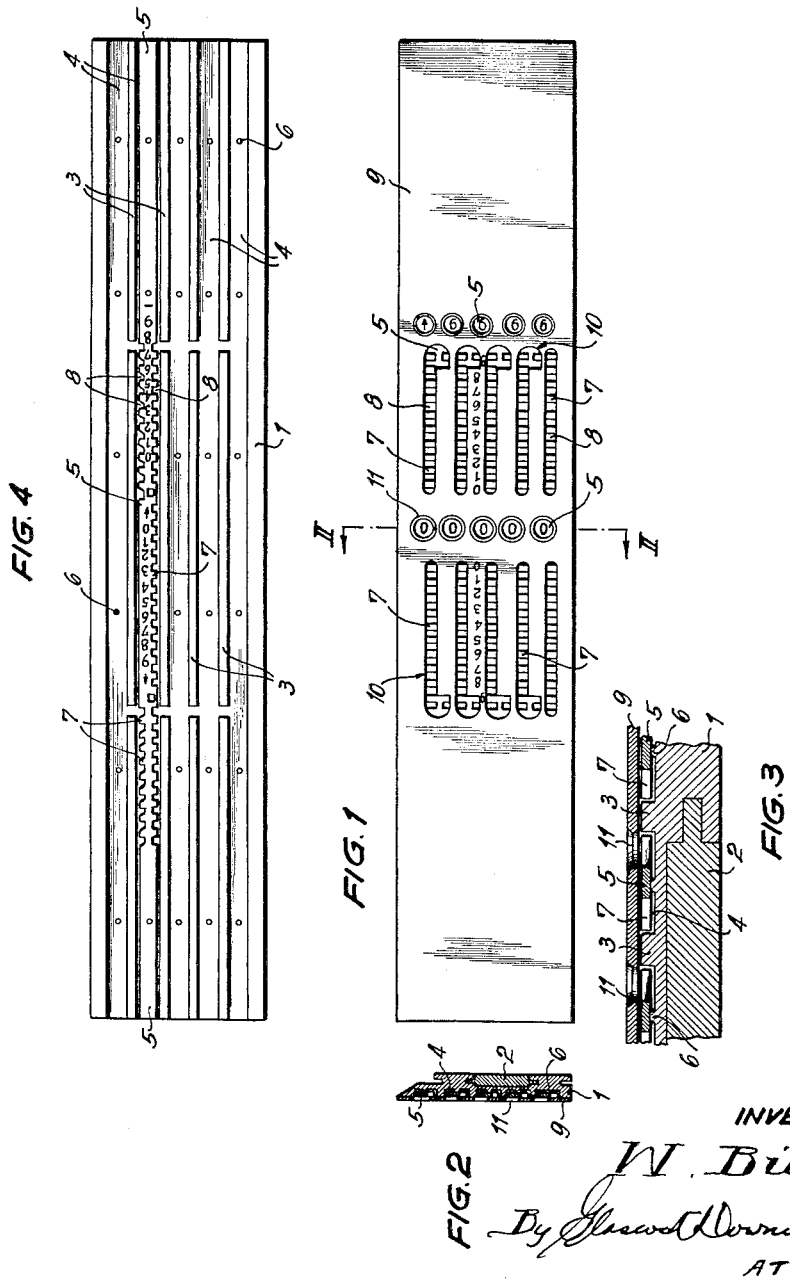
INVENTOR
W. Bülow May 9, 1961　　　　W. BÜLOW　　　　2,983,447
SLIDE RULE AND ADDING DEVICE COMBINATION
Filed Sept. 24, 1953　　　　　　　　　　2 Sheets-Sheet 2
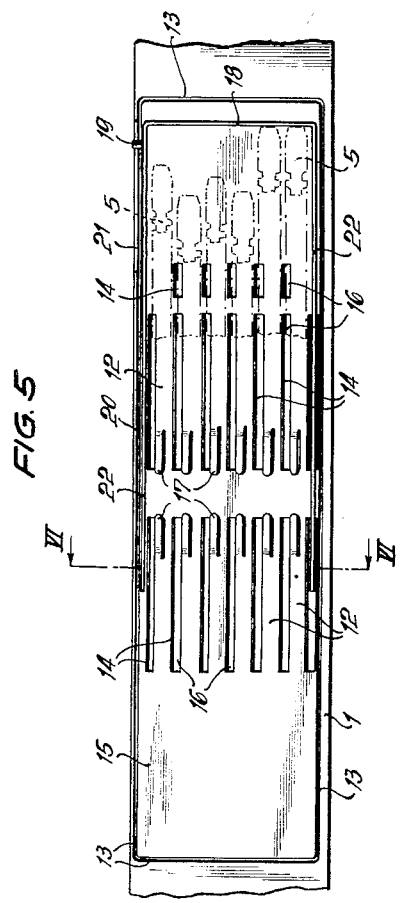
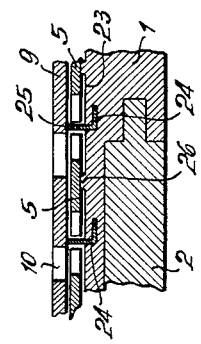
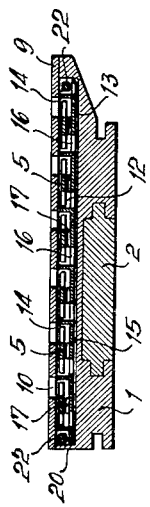
INVENTOR
W. Bülow United States Patent Office 2,983,447
Patented May 9, 1961

2,983,447

SLIDE RULE AND ADDING DEVICE COMBINATION

Willy Bülow, Geroldsgrun, Upper Franconia, Germany, assignor to A. W. Faber-Castell, Stein, near Nurnberg, Germany, a firm Filed Sept. 24, 1953, Ser. No. 382,040

Claims priority, application Germany Sept. 26, 1952

2 Claims. (Cl. 235—69)

Slide rules having slides for different calculating operations arranged both on the front and rear sides thereof are known in the most varied forms. With such slide rules it is also already known, for example, to provide on one side arrangements for higher types of calculations, such as multiplication, division, involution, evolution and the like, whereas such arrangements for simple types of calculation, such as addition and subtraction, can be arranged on the rear side in the form of slides. These slide rules are also so fashioned that the small adding device, formed as a constructional unit, is fitted into the body of a normal slide rule, and a cover plate is disposed over the rear side of the slide rule and the surface of the small adding device. It is obvious that such slide rules are extremely unhandy and unpractical, since they are not only of relatively considerable thickness but also because they are considerably heavier than slide rules which have no such additional arrangement.

The present invention avoids all these disadvantages in that grooves are provided in the body of the slide rule corresponding to the number of slides, for example, of an adding device, the depth of said grooves substantially corresponding to the thickness of the slides; this means, in other words, that the slide rule itself forms the housing for the individual parts of an adding device of any desired construction and according to a preferred constructional example of the invention the cover plate which secures the slides in the grooves or holds calculating parts, for example, toothed discs fashioned to be variously movable, and which has perforations in a manner known per se, for reading the numbers, simultaneously serves as the rear cover plate of the slide rule. It has thereby become possible to fit a small adding device into a normal slide rule without the slide rule becoming noticeably thicker than the usual slide rules.

Now there are several constructional possibilities for putting the invention into practice. Thus it is possible for the ribs forming the grooves to be joined to a thin plate, for example, of plastic, metal, e.g. of light metal or steel, or to be produced in one piece with said thin plate, the length, breadth and height of the recess of the slide rule body corresponding in such manner to the equivalent measurements of the plate inclusive of the ribs thereof that the ribs end in the plane of the rear side of the rule.

Furthermore it is possible in slide rules which are injection moulded from a hardenable synthetic substance, to form these ribs wholly of synthetic substance in one working operation with the slide rule. On the other hand the ribs can be injected in the form of thin strips of metal into a rule body which is injection-moulded from a synthetic substance.

Although it may possibly be advantageous if the grooves extend over the whole length of the slide rule body, it is however also possible according to a further feature of the invention for the grooves to be provided only over part of the length of the slide rule or to be interrupted several times in their length, so that the slides are guided only between individual relatively short wall sections.

Finally the individual slides of the small adding device may be mounted so as to be displaceable on small substantially punctiform raised portions of the recess in the slide rule body, in order to fashion said slides in an easily movable form. If the slide rule body is made of a synthetic substance, then these raised portions are injection moulded along with the said rule body; if a base plate of metal is used, then resilient flanges may readily be pressed out therefrom.

In calculating appliances for simple calculating operations, therefore for example in a small adding device, a return frame is generally arranged for returning the individual slides once more to their starting position after the calculation has been completed.

In a slide rule according to the invention it is possible to allow the operating member of the return frame to project outwards through a lateral cut-out in the rule, and, as a further preferred constructional example of the invention indicates as advantageous, it is possible not to allow this projection of the return frame to project beyond the contour of the side surface of the slide rule body.

Several constructional examples of the invention are shown diagrammatically in the figures, wherein:

Figure 1 is a plan view of the underside of a slide rule with a five-position adding device;

Figure 2 is a sectional view along the line II—II of Figure 1;

Figure 3 shows a section of Figure 2 on an enlarged scale;

Figure 4 is a view of Figure 1 with the cover plate removed;

Figure 5 is a view of the slide rule body with the cover plate removed, in another constructional example of the invention;

Figure 6 is a sectional view along the line VI—VI of Figure 5; and

Figure 7 is a sectional view on an enlarged scale of another constructional example of the invention.

The slide rule consists of the body 1 and the tongue 2 which is mounted in the said body and which is used for calculations of a relatively advanced type, such as, for example, multiplication, division, involution and evolution. The slide rule body part 1 of Figures 1 to 4 consists of an injection moulded synthetic substance. This slide rule body part is on the rear side thereof so fashioned that ribs 3 extend along its entire length. Between these ribs are provided grooves 4 in which individual slides 5 are displaceably mounted. These ribs 3 are produced in one piece with the slide rule body part. The bottom surface of the grooves have raised portions, more especially punctiform raised portions 6, as can be seen from the enlarged sectional view in Figure 3. These punctiform raised portions are expediently situated at preferably regular intervals from one another and in the middle of the grooves, so that they cannot be detained in the intervals 8 formed between the teeth 7 of the slides and prevent the slides being moved. An extremely easy sliding of the slides 5 is achieved by means of these punctiform raised portions. The slides themselves consist, in a manner known per se, of toothed rails provided with numerals. They consist preferably of light metal, but it is also possible for them to be made of a synthetic substance or the like, for example in an injection moulding operation. In Figure 4 only one such rail is shown. It can be seen from this figure, however, that the slides 5 extend over the entire length of the slide rule.

Over the underside of the slide rule is arranged a cover plate 9 which may be secured to the slide rule body 1 for example by means of screws or the like. This cover plate fixes the slides which have previously been placed in the grooves 4, and at the same time serves as a cover plate for the whole slide rule. It is provided with perforations 10 and 11 which serve in known manner for setting or reading off the figures. The cover plate 9 thereby fixes not only the movable slides 5 of the calculating appliance in their guides, but at the same time it serves as the cover for the entire rear side of the slide rule. When calculations are made with the small adding device the individual slides are moved in known manner by means of a metal pin. When the calculations are finished the slides, which now project more or less beyond the ends of the slide rule, are pushed back into the rule, which can be effected, for example, simply by placing one of the ends of the slide rule on a flat surface.

In the constructional examples of Figures 5, 6 and 7 the grooves do not extend along the whole side of the slide rule body, but the grooves 12 serving the slides 5 in this constructional example only extend over a part of the length of the slide rule body. For this purpose the rear side of the slide rule body is provided with a recess 13 extending almost over the entire width of the rule body but only over a part of the length thereof, the depth of the said recess corresponding substantially to the height of the ribs 14. In the constructional example of Figures 5 and 6 the ribs 14 are pressed out of a thin strip of metal 15. This makes it possible, by choosing very thin ribs, to arrange six slides 5 adjacent one another, so that a calculating appliance so constructed may be used for calculations with six figures. The ribs 14 may be formed by cutaway portions 16 being formed from the plate 15 and the flanges at the edges of said cutaway portions being pressed upwards. At at least two places resilient flanges 17 are pressed upwards to a slight extent from the metal plate, within the grooves 12, said resilient flanges being intended to take the place of the punctiform raised portions 6 of the first constructional example of the invention. It can be seen that the ribs 14 do not extend over the entire length of the plate 15, but that the slides 5 are guided in the grooves by these ribs only at specific places.

Since the plate 15 is only a fraction of a millimeter in thickness, and the resilient flanges likewise project only to a very slight extent beyond the flanges, and since furthermore the slides 5 are kept extremely thin, the small adding device can be arranged in a recess of the slide rule body which is not much deeper than 1 mm. Naturally, the individual parts are shown in the drawings partially on an exaggerated scale, so that they can actually be discerned.

Since in this adding device the slides 5, which in Figure 5 are only indicated at one end in chain-dotted lines, do not extend over the entire length of the slide rule, they therefore do not project beyond one end of the slide rule during calculations, it is necessary to afford a possibility of speedily returning the individual slides to the starting position after calculations have been completed. For this reason there is provided a frame 18 which carries a projection 19. Furthermore the slide rule body rim 20 which forms the boundary of the recess 13 at one longitudinal edge is provided with a cut-out 21 which extends over a specific part of the length of the recess and in which the projection 19 of the frame 18 is guided. The projection 19 does not need to project beyond the side surface of the slide rule body, since it can be moved by means of a metal pin with which the individual slides may also be moved in known manner. Although the frame 18 is represented in Figure 5 as a U-shaped frame, the leg 22 of the frame 18 may if necessary be omitted, since a sufficiently reliable guiding of the frame 18 may be achieved by a short truncated leg portion instead of the long leg 22.

The method of calculating with the individual slides 5 is sufficiently well known per se, so that there is no need to take up the matter here in detail. If the slides 5, which have been moved back and forth by means of a metal pin, have to be returned to the zero position, the projection 19 may be moved to the left by means of a metal pin as in Figure 5, whereby the frame 18, as indicated in Figure 5, likewise feeds to the left the slides in this figure.

In the constructional example of Figure 7, which represents only one part of an enlarged sectional drawing, the slide rule body 1 consists of an injectable synthetic substance, whereas in the constructional example of Figures 5 and 6 it may consist of wood or any other material. In this constructional example the grooves 23 are formed by angle rails 24 which are moulded into the slide rule body 1. It is thereby made unnecessary on the one hand to provide a special base plate 15, and on the other hand the advantage is achieved, as compared with the constructional example in Figure 1, that the ribs 25 can be kept very thin, while still having sufficient rigidity to provide a satisfactory guiding for the slide even if a lateral pressure should be exerted by the metal pin moving the slides if the appliance is being used rapidly and carelessly. In this constructional example also raised portions 26 are moulded on the slide rule body part in order that the slides 5 may receive a satisfactory guiding. Finally, in this constructional form just as in the constructional forms described in the foregoing, there is provided the cover plate 9 which retains the slides in their guides and covers the slide rule on the rear side thereof.

I claim:

1. In a slide rule of the type including a rule body having a plane rear face, a lengthwise extending flat bottomed shallow recess in said rear face, a cover plate covering said rear face of the rule body and fixed thereto, additional computing means including a sheet metal filler for said recess having parallel slide channels formed therein extending lengthwise of said recess, appropriately notched and numbered slide elements slidably mounted in said slide channels, the upper wall of said slide channels being formed by said cover plate, the lateral side walls of said slide channels being formed by a plurality of parallel ribs struck from said sheet metal filler, and resilient friction means in the bottom wall of each slide channel adapted to press said slide elements against the cover plate, said cover plate being provided with apertures extending lengthwise of said slide elements and in cooperative relation therewith to give access for the manipulations of said computing means.

2. In a slide rule of the type including a rule body, said rule body having a plane rear face, a lengthwise extending flat bottomed shallow recess in said rear face of said rule body, a cover plate covering said rear face of the rule body and said recess, a relatively flat additional computing means including a sheet metal bottom plate of substantially the same area as the recess bottom disposed upon the latter, slide channels formed by said sheet metal bottom plate, including a plurality of parallel ribs to form the side walls of said slide channels pressed out of said bottom plate and bent upwardly, said cover plate abutting the upper edge of said ribs, slide elements slidably held in said slide channels, resilient friction means in the bottom wall of each slide channel including elements struck upwardly from the surface of said bottom plate adapted to press said slide elements against said cover plate, said cover plate being provided with elongated apertures arranged with respect to said slide elements to give access to said slide elements to provide for the manipulations and observation of said slide elements to perform computations.

References Cited in the file of this patent

UNITED STATES PATENTS

| | | |
|---|---|---|
| 892,704 | Baurle | July 7, 1908 |
| 941,004 | Brandt | Nov. 23, 1909 |
| 1,422,944 | Edmondson | July 18, 1922 |
| 1,596,108 | Kubler et al. | Aug. 17, 1926 |
| 1,661,277 | Thomas | Mar. 6, 1928 |
| 1,875,927 | Keuffel | Sept. 6, 1932 |
| 2,153,089 | Kubler | Apr. 4, 1939 |
| 2,238,529 | Kubler | Apr. 15, 1941 |

FOREIGN PATENTS

| | | |
|---|---|---|
| 655,353 | Germany | Apr. 13, 1938 |